INVENTOR.
Jiří Hrdina
BY

United States Patent Office 3,518,874
Patented July 7, 1970

3,518,874
APPARATUS FOR ANALYZING MIXTURES OF
SUBSTANCES IN ONE OR A PLURALITY OF
CHROMATOGRAPHIC COLUMNS
Jiří Hrdina, Prague, Czechoslovakia, assignor to
Ceskoslovenská akademie ved, Prague, Czechoslovakia, a corporation of Czechoslovakia
Filed Apr. 28, 1965, Ser. No. 451,518
Claims priority, application Czechoslovakia,
May 26, 1964, 3,036/64
Int. Cl. G01n *31/08*
U.S. Cl. 73—61.1        5 Claims

ABSTRACT OF THE DISCLOSURE

In a series of pumps working in parallel each pump draws eluent from its own operatively associated reservoir and pumps it into a common line leading towards the column or columns. Samples are delivered thereinto in controllable manner either by the last pump in said series or by a pressure charger.

Figures 1, 2:
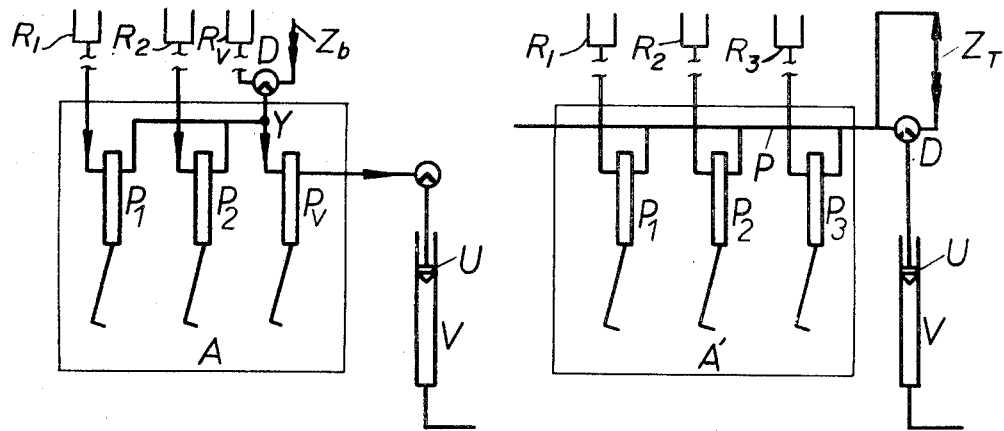

My invention relates to known apparatus for analyzing a sample containing a mixture of standard amino acids on a single column within about twenty-two hours. This apparatus requires a manual placing of the sample on the open column prior to each analysis as well as the charging of a plurality of chambers of a special type mixer from which a main pump draws an eluent of a variable composition controllable within certain limits according to known principles. These make it possible to meter out a continuous gradient in such a way that different eluents work in portions of the chromatogram with different effectiveness but invariably within the limits of constrained conditions resulting from a complex hydrostatic maximum effect of the mixer or similar apparatus. This type of apparatus permits a certain amount of flexibility but not within limits possibly permitting the pH value or the ionic force to jump to a certain value and then again rapidly fall or jump downward to another value.

The said mixing apparatus requires additionally a special photoelectric automatic control means which terminate the action of the pump after the mixer has been emptied. The precise moment therefore cannot be accurately identified and programmed in view of certain variations of the rate at which the pump works, as well as in view of the fact that the mixer is filled with liquid with limited accuracy.

The above disadvantages are avoided by the apparatus according to my invention which permits a speed up of a complete process of separation in a single column to ten or five hours or even less. With this new device the only manual manipulation required in one whole series of analyses will be the charging of the storage container with the samples to be analyzed and possibly a supplementation of the materials required for the accomplishment of the process of separation and its evaluation such as a supplementation of the required solutions for elution of the evaluating reagent on the recording paper. In this respect only my new apparatus achieves full automation of operation. In contrast the known apparatus though called "automatic" are actually only "semi-automatic" since only the continuous evaluation of the eluent issuing from the column is automatic.

According to the present invention eluents of variable quality which flow through one or a plurality of columns are supplied by a complex pumping apparatus consisting of a number of primary reciprocating precision pumps programmed at least in part and delivering to a common output branch respective amounts of eluent proportional to the total amount of eluent to be delivered by a terminal pump into the column which additionally draws a residual portion of eluent. The eluents are automatically metered out to one or to a plurality of columns and a new sample to be analyzed is pumped without pressure or under pressure to the column at a time when a cycle is completed, the entire complex apparatus being controlled by a centralized programming device. Each of the eluents is programmed at discretion as to quality and quantity in a time unit, the quality of the eluent being determined by blending of the fluids supplied by the respective pumps which meanwhile can be programmed separately.

Figure 3:
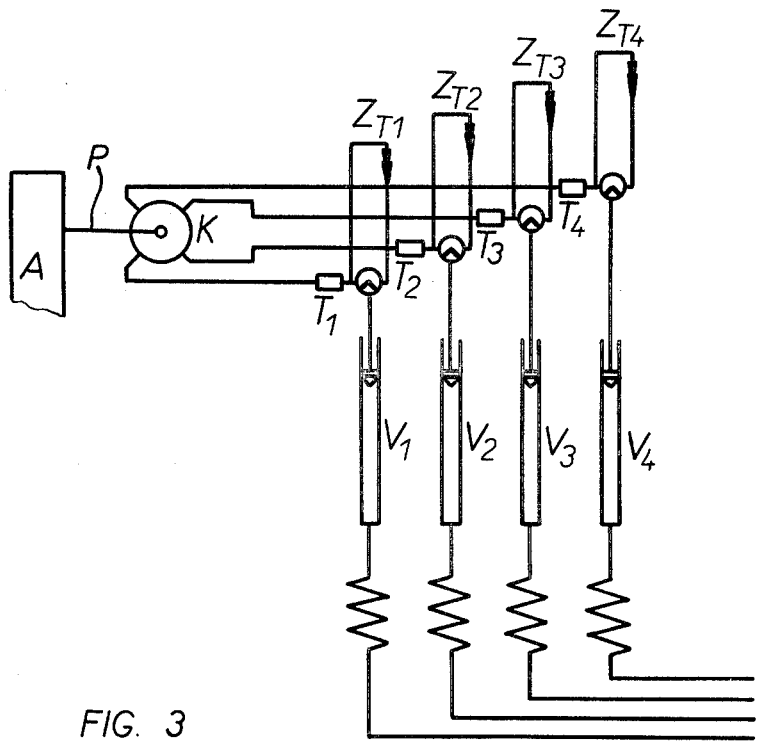

The said and other objects and advantages of my new apparatus will be more fully understood from the following specification when read with the accompanying drawing in which FIGS. 1, 2 and 3 each show schematically an embodiment of my invention.

In the embodiment illustrated in FIG. 1, a terminal pump $P_v$ forces eluent into a column V through its closure U. The amount of eluent that passes through the column V in a time unit is determined by the instantaneous volume output of the terminal pump $P_v$ which may be either constant or programmed the same as may be the volumetric outputs of the preceding primary pumps $P_1$ and $P_2$, each of which draws eluent from associated reservoirs $R_1$, $R_2$ towards T-joint Y of which one branch is connected to the intake of the terminal pump $P_v$. The quality of the eluent supplied by this and pump $P_v$ to the column V is determined by the ratio of the quantities supplied by the pumps $P_1$, $P_2$ and by the supplemental hydraulic output of the pump $P_v$. This supplement is drawn by the pump $P_v$ from a fluid reservoir $R_v$, if the (2+1)-way valve D is positioned to permit a through-flow in the joint Y from the reservoir $R_v$. If however, the valve D is positioned to connect the joint Y to the sample reservoir $Z_b$ which can be pressure free, the pump $P_v$ draws a proper volume of the sample. This sample is placed by the pump $P_v$ through the column closure U on top of the charge in the column V.

The individual pumps $P_1$, $P_2$ and $P_v$ can have a common drive while either all of them or only some may work in programmed manner. These pumps may be assembled in group or aggregate represented by square A in FIG. 1.

In the majority of current separation processes the used eluent may consist of two components only. In such case only one of the primary pumps $P_1$, $P_2$ and terminal pump $P_v$ are required.

With the said arrangement, no matter how pumps $P_1$, $P_2$, $P_v$ are constructed there is achieved over the mixing apparatus mentioned in the introduction to this specification the advantage permitting the entire device to work continuously in each other following cycles. As a result my new apparatus avoids the earlier mentioned photoelectric or other watching devices intended to warrant exact and timely termination of analyses at the moment of exhaustion of the content of a conventional mixer. It is also possible by a mere change of the driving means for the pumps, or any one of them, to establish at discretion a program of qualitative and quantitative changes of the eluent forced by the terminal pump $P_v$ into column V.

FIG. 2 shows another embodiment of my invention in which a number of mutually independent primary pumps, for example three pumps $P_1$, $P_2$, $P_3$ each draw eluent from its own storage reservoirs $R_1$, $R_2$, $R_3$ in parallel into a common delivery conduit P through which the resultant mixture of eluent flows into column V through its closure U. FIG. 2 also shows how a pressurized type of a sample reservoir $Z_T$, i.e., a pressure charger or doser $Z_T$, connected to a (2+1)-way valve D can be included into the pressurized end portion of tubing P between the terminal pump $P_3$ and the closure U. It is evident that the pipe connections between the reservoirs $R_1$, $R_2$, $R_3$ and pumps $P_1$, $P_2$, $P_3$ or between valve D and the closure U have to be capillary, in the same way as in the embodiment illustrated in FIG. 1 a capillary tubing leads from the sample reservoir $Z_b$ up to the closure U; furthermore, for correct operation the terminal pump $P_3$ has to have a minimal dead space to avoid deterioration of the resultant separation due to mixing processes in the dead spaces of the pump $P_3$. It is evident that the arrangement of the storage reservoirs $R_1$, $R_2$, $R_3$ or of the pressure charger $Z_T$ quite closely before the colume V has, as far as a reduction of blurring affecting the steepness of the separation in the column is concerned, a considerable advantage over the use of a pressure free charger permitted to be made without regard to arising pressures, which otherwise will exist in the entire hydraulic circuit of the pressure charger $Z_T$ shown in FIG. 2.

FIG. 3 schematically illustrates an embodiment wherein the output from the pump aggregate A which includes a plurality of pumps $P_1$, $P_2$, $P_3$ is conducted towards a distributor possibly being a (4+1)-way distributor valve K, which successively connects the conduit P leading from the pump aggregate A into the central inlet of the valve K with the peripheral outlets of the valve K each leading to one of the four columns $V_1$ to $V_4$ possibly over pulsation dampers $T_1$ to $T_4$ and pressurized dosing devices $Z_{T1}$ to $Z_{T4}$ as referred to and shown in FIG. 2. The distributor valve K rotates intermittently in such manner that after one stroke or pulse transmitted by the last pump in the aggregate A and at the time of repose in the delivery branch P the valve K turns by one spacing to connect said delivery branch P to the next column. The valve K can form part of the pump aggregate A and its motions can be interlocked mechanically with the motions of the pumps of the aggregate. This can be accomplished for instance in known manner by a ratchet mechanism, a Geneva cross mechanism or the like. In this way a single aggregate may supply for example four columns $V_1$ to $V_4$ with the identical eluent and ensure identical qualitative and possibly also quantitative changes for all the columns. This arrangement not only results in savings since the achieved output corresponds to four separate and independent analysers which of course may have common programming and pumping means but it also achieves an increased guarantee of identity of conditions for all columns in view of a warranted identity of qualitative and quantitative factors in respect of the elution.

An added advantage of my new apparatus consists in the possibility of comparing two or more analyses performed under the same conditions and of identifying even small arising differences.

I claim:

1. In an apparatus for analyzing samples of mixtures of substances in at least one chromatographic column the improvement comprising in combination
   first and second primary reservoirs for eluent;
   first and second primary pumps, one of said pumps connected to one of said reservoirs to draw eluent therefrom, the other of said pumps connected to the other of said reservoirs to draw eluent therefrom;
   a pipe line receiving eluent in parallel from said pumps;
   a T-joint terminating said pipe line;
   a supplemental eluent reservoir, a sample reservoir and a tubular connection therebetween;
   a threeway valve in said connection communicatingly associated with one branch of said T-joint and adapted to connect the T-joint selectively with the supplemental eluent reservoir and the sample reservoir;
   a terminal puump operatively associated with another branch of the T-joint and delivering selectively eluent and a sample to and through closure means at the top of the column.

2. In an apparatus for analyzing samples of mixtures of substances in at least two chromatographic columns according to claim 1
   a distributor valve receiving said pipe line after the last pump and having at least two outlets each communicatingly associated with one column.

3. In an apparatus for analyzing samples of mixtures of substances in at least one chromatographic column, the improvement which comprises
   first and second primary eluent reservoirs;
   a first primary pump and a second primary pump, one of said pumps connected to one of said reservoirs to draw eluent therefrom, the other of said pumps connected to the other of said reservoirs to draw eluent therefrom;
   conduit means receiving eluent in parallel from said primary pumps;
   valve means connected to and receiving said conduit means;
   a pressurized sample doser connected to said conduit means and connected to said valve means, said pressurized sample doser operatively associated with and controlled by said valve means to deliver samples selectively into the chromatographic column, and
   second conduit means leading from said valve means to closure means at the top of the chromatographic column.

4. The apparatus of claim 3, which apparatus further comprises
   a third primary reservoir for eluent;
   a third primary pump connected to said third primary reservoir to draw eluent therefrom; said conduit means receiving eluent in parallel from said third primary pump.

5. The apparatus of claim 4, which apparatus further comprises
   at least two chromatographic columns, and
   distributor valve means receiving said second conduit means, said distributor valve means communicatingly associated with said columns.

References Cited

UNITED STATES PATENTS

| | | | |
|---|---|---|---|
| 2,790,016 | 4/1957 | Lamneau | 73—61.1 X |
| 3,074,784 | 1/1963 | Ferrari | 23—253 |
| 3,166,929 | 1/1965 | Pelavin | 73—61.1 |
| 3,220,246 | 11/1965 | Barnum | 23—253 X |
| 3,230,048 | 1/1966 | Skeggs | 23—253 |
| 3,294,490 | 12/1966 | Hach | 23—253 |
| 3,010,798 | 11/1961 | Whitehead et al. | 23—253 X |
| 3,097,927 | 7/1963 | Skeggs | 23—253 X |
| 3,373,872 | 3/1968 | Hrdina. | |
| 3,375,080 | 3/1968 | Fujii et al. | 23—253 |
| 3,422,271 | 1/1969 | Fuhrmann | 23—253 X |

JOSEPH SCOVRONEK, Primary Examiner

U.S. Cl. X.R.

23—253; 210—198